(12) United States Patent
Varghese et al.

(10) Patent No.: US 9,992,777 B2
(45) Date of Patent: Jun. 5, 2018

(54) SYSTEM AND METHOD FOR ADVISING WIRELESS COMPUTER NETWORKS ON INTER-NETWORK INTERFERENCES

(71) Applicant: ABB TECHNOLOGY LTD., Zurich (CH)

(72) Inventors: Anitha Varghese, Bangalore (IN); Deepaknath Tandur, Bangalore (IN); Mallikarjun Kande, Bangalore (IN); Ravish Kumar, Bangalore (IN); Tuncay Gülfirat, Mannheim (DE)

(73) Assignee: ABB SCHWEIZ AG, Baden (CH)

( * ) Notice: Subject to any disclaimer, the term of this patent is extended or adjusted under 35 U.S.C. 154(b) by 0 days. days.

(21) Appl. No.: 15/515,178

(22) PCT Filed: Sep. 4, 2015

(86) PCT No.: PCT/IB2015/056752
§ 371 (c)(1),
(2) Date: Mar. 29, 2017

(87) PCT Pub. No.: WO2016/051294
PCT Pub. Date: Apr. 7, 2016

(65) Prior Publication Data
US 2017/0230982 A1 Aug. 10, 2017

(30) Foreign Application Priority Data
Oct. 1, 2014 (IN) .......................... 4955/CHE/2014

(51) Int. Cl.
*H04W 24/08* (2009.01)
*H04W 72/08* (2009.01)
(Continued)

(52) U.S. Cl.
CPC ......... *H04W 72/08* (2013.01); *H04L 43/0882* (2013.01); *H04L 43/12* (2013.01);
(Continued)

(58) Field of Classification Search
CPC ..... H04W 72/08; H04W 16/14; H04W 24/08; H04W 12/00; H04W 28/0236;
(Continued)

(56) References Cited

U.S. PATENT DOCUMENTS 9,480,054 B1 * 10/2016 Schein ................ H04W 52/343
2010/0041408 A1 * 2/2010 Caire .................... H04L 5/0007
455/446

(Continued)

OTHER PUBLICATIONS

International Search Report, International Application No. PCT/IB2015/056752, dated Nov. 25, 2015, 3 pages.
(Continued)

*Primary Examiner* — Andrew Wendell
(74) *Attorney, Agent, or Firm* — Barnes & Thornburg LLP

(57) ABSTRACT

The present invention provides a system and method for advising wireless computer networks on inter-network interferences during their life time. The method of the present invention initially observes initial channel utilization profiles along with corresponding time-slots of dynamic network elements and network characteristics of a first network and stores as historical channel utilization profiles. The initial transmission profiles an interfering second network are also recorded. The threshold transmission profiles are then recorded as historical transmission profiles. The aggregator determines interference patterns, by comparing historical channel utilization profiles with runtime threshold transmission profiles and advises and pre-warns appropriate network actions to a network manager of the first network on the interference prone zones. The system of the present invention includes a first network with a common multi-network interference observer, to advise on inter-network interferences.

15 Claims, 9 Drawing Sheets

(51) Int. Cl.
    *H04B 15/02*     (2006.01)
    *H04W 16/14*     (2009.01)
    *H04L 12/26*     (2006.01)
    *G05B 19/418*     (2006.01)
    *H04W 12/00*     (2009.01)

(52) U.S. Cl.
    CPC ............. *H04L 43/50* (2013.01); *H04W 16/14* (2013.01); *H04W 24/08* (2013.01); *G05B 19/418* (2013.01); *H04W 12/00* (2013.01)

(58) Field of Classification Search
    CPC ........ H04B 1/0475; H04B 1/10; H04B 15/02; H04L 43/12; G05B 19/418
    See application file for complete search history.

(56) References Cited

U.S. PATENT DOCUMENTS

| | | |
|---|---|---|
| 2011/0280226 A1 | 11/2011 | Lennvall et al. |
| 2011/0305224 A1* | 12/2011 | Lin ...................... H04B 17/101 370/336 |
| 2012/0108179 A1 | 5/2012 | Kasslin et al. |
| 2013/0244670 A1* | 9/2013 | Biermann .............. H04B 7/024 455/446 |
| 2015/0063148 A1* | 3/2015 | Sadek ............... H04W 74/0816 370/252 |
| 2015/0148050 A1* | 5/2015 | Siomina ................. H04J 11/005 455/452.1 |
| 2016/0234825 A1* | 8/2016 | Axmon ................... H04W 8/00 |
| 2017/0006483 A1* | 1/2017 | Attanasio ............ H04L 43/0876 |
| 2017/0207827 A1* | 7/2017 | Cui ........................ H04B 7/024 |
| 2017/0230983 A1* | 8/2017 | Abdelmonem ..... H04W 72/082 |

OTHER PUBLICATIONS

Written Opinion issued in connection with International Application No. PCT/IB2015/056752, dated Nov. 25, 2015, 7 pages.

International Preliminary Report on Patentability, International Application No. PCT/IB2015/056752, dated Apr. 4, 2017, 8 pages.

* cited by examiner

| Time slot → <br> Chan. offset ↓ | 1 | 28 | 29 | 93 | 98 | 146 | 157 | 161 | 180 | 221 | 222 | 226 | 349 |
|---|---|---|---|---|---|---|---|---|---|---|---|---|---|
| 0 | 7→2 | 7→2 | | | | | | | | | | | |
| 1 | | | | | | | | | | | | | |
| 2 | | | | | | | | 3→1 | | | | | |
| 3 | | | | | | | | | | | | | |
| 4 | | | | | | | | | | | | | |
| 5 | | | | | | | | | | | | 4→6 | |
| 6 | | | | | | | | | 5→ FFF0 | | | | |
| 7 | | | | | 6→1 | | | | | | | | |
| 8 | | | | | | 5→1 | 7→2 | | | | | | |
| 9 | | | 2→6 | | | | | | | 6→ FFFF | | | |
| 10 | | | | 2→6 | | | | | | | | 6→1 | 2→6 |

FIG.8

| S.No | Channel Utilisation Profile/ Transmission Profile | Type | Schematic | Interference Pattern | Advice |
|---|---|---|---|---|---|
| 1 | Periodic | Information | 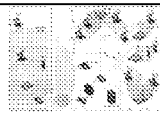 | WLAN activity is high | Use non interfering channels |
| 2 | Periodic | Periodic Event + Action | 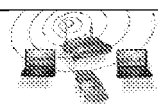 | Office timing coming up. Networks are going to be active in cubicles | Route the WirelessHart packets |
| 3 | Periodic | Information |  | WHART transmission schedule for the next 'n' frames in the interference prone zone | Consider to minimize interference |
| 4 | Periodic | Warning |  | Channel 1 and 6 will be active for the upcoming interval most likely for a certain duration | Black list 802.15.4 channels that overlap with channels 1 and 6 of WLAN |
| 5 | Aperiodic | Information | 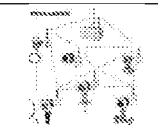 | This is my network. Do not use it | Divert to another available channels |
| 6 | Aperiodic | High Priority |  | Dump Vehicle has come to the yard | Use Less bandwidth / Channels in the interference prone area |

FIG.9

SYSTEM AND METHOD FOR ADVISING WIRELESS COMPUTER NETWORKS ON INTER-NETWORK INTERFERENCES

CROSS-REFERENCE TO RELATED APPLICATIONS

This application is a U.S. national stage of International Application Serial No. PCT/IB2015/056752, filed Sep. 4, 2015, which claims priority to Indian Patent Application No. 4955/CHE/2014, filed Oct. 1, 2014. The entire disclosures of both of the foregoing applications are hereby incorporated by reference.

TECHNICAL FIELD

The present invention relates to a system and method for advising wireless computer networks on inter-network interferences.

BACKGROUND OF THE INVENTION

In a multiple network environment deployed in a large field there is a need to manage the interference during the lifetime of the networks. This is because several communication protocols such as Wireless Highway Addressable Remote Transducer (WirelessHART) and WLAN work on the same Industrial, Scientific and Medical (ISM) frequency band, and sometimes in close vicinity, causing interference to each other.

Both WirelessHART and WLAN standard-based networks are deployed to operate on the same unlicensed radio frequency bands meant for industrial, scientific and medical (ISM) usage. When both these networks are operated in the same industrial plant or in the near vicinity to each other, then there is bound to be interferences between them. The effect of these interferences and the resulting performance degradation are well-known in the art.

In a WirelessHART network, the pseudo-random channel hopping feature ensures that the WirelessHART network is not fixed on a particular channel for any lengthy period of time. Thus this feature can eliminate the interference to a certain extent. However, problems occur when two or more packets of information are transmitted at the same time and frequency such that the packets "collide" in the same physical space. Even with careful system modeling and the deployment of the network, it is not always possible to limit the interferences over a life cycle period of the industrial plant; this could mainly be due to the change in topology of either of the network (addition or removal of the network elements) or with the change in the plant physical structure itself. Any pre-operation interference avoidance technique mainly considers only the historical interference information data for giving any necessary inputs to the planning and the engineering phase. Thus the dynamic changes in the network (topology, physical structure, priority to certain network elements) and the resulting interferences occurring during the operation phase cannot be adequately addressed. Accordingly, additional measures are required during the operational phase of the network so as to limit the effects of interference, from other interfering networks.

OBJECTS OF THE PRESENT INVENTION

The primary object of the present invention is to provide a system and method for advising wireless computer networks on inter-network interferences, based on utilizing runtime and historical channel utilization data of network elements of an interfered network and transmission profiles of interfering networks.

An object of the present invention is to provide a system and method for advising wireless computer networks, in which a common multi-network interference advisor is configured to advise the networks on periodic and aperiodic inter-network interferences, during the lifetime of the networks.

It is also an object of the present to provide a system and method for advising wireless computer networks, in which a common multi-network interference advisor is configured to pre-warn a possible inter-network interference preventive action, based on pattern matching from historical events.

It is also an object of the present to provide a system and method for advising wireless computer networks, in which a common multi-network interference advisor is configured to advice networks, by considering patterns on the possible inter-network interferences, prior to the occurrence of such interferences from a neighboring network.

Another object of the present invention is to provide a system and method for advising wireless computer networks on inter-network interferences, which are adaptive to dynamic changes in network elements and network characteristics, during the lifetime of the networks.

SUMMARY OF THE INVENTION

The present invention provides a system and method for advising wireless computer networks on inter-network interferences during their life time. The method of the present invention initially observes initial channel utilization profiles along with corresponding time-slots of dynamic network elements and network characteristics of a first network and stores as historical channel utilization profiles. The initial transmission profiles an interfering second network are also recorded. The threshold transmission profiles are then recorded as historical transmission profiles. The aggregator determines interference patterns, by comparing historical channel utilization profiles with runtime threshold transmission profiles, advises and pre-warns appropriate network actions to a network manager of the first network on the interference prone zones. The system of the present invention includes first network with a common multi-network interference observer, to advise on network interferences.

BRIEF DESCRIPTION OF THE DRAWINGS

FIG. 8 depicts exemplary advisor actions of CMIA of the present invention.

FIG. 9 is a table that illustrates an example of method of where dynamic changes in channel and time-slot occupancies of an interfered network are implemented.

DETAILED DESCRIPTION OF THE INVENTION

The subject matter of the present invention will now be described more fully hereinafter with reference to the accompanying drawings. The present invention may, however, be embodied in many different forms and hence should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

In the present invention a system for advising wireless computer networks on inter-network interferences, is described, which is based on utilizing both historical as well as the on-the-fly information, of network activities and inter-network interferences.

Accordingly, in the present invention a multiple network environment deployed in a large field, is described wherein a multi-network interference advisor (CMIA) secures the run-time and historical activity information of the network elements of the monitored network(s), and then provides only the relevant activity information for the interference prone zones to the targeted network(s) advised, in the form of an advice. The advice includes, historic database based pre-warning of a potential high activity interval, run time activity information, runtime interference information and possible preventive action based on pattern matching from earlier events in a database.

The system of the present invention can be implemented in environments such as two or more WLAN networks working in close vicinity of each other, two or more WirelessHART network working in close vicinity of each other, one WirelessHART network is operating in the vicinity of a WLAN network, any network operating in the ISM band of frequencies, and so forth.

Accordingly, the present invention provides a system for advising wireless computer networks on inter-network interferences, particularly for heterogeneous networks. The inter-network interferences are generally radio-frequency interferences arising out of the overlapping of operating channels, frequency and magnitude of the transmission of the transmitting devices of the neighbouring networks.

Figure 1:
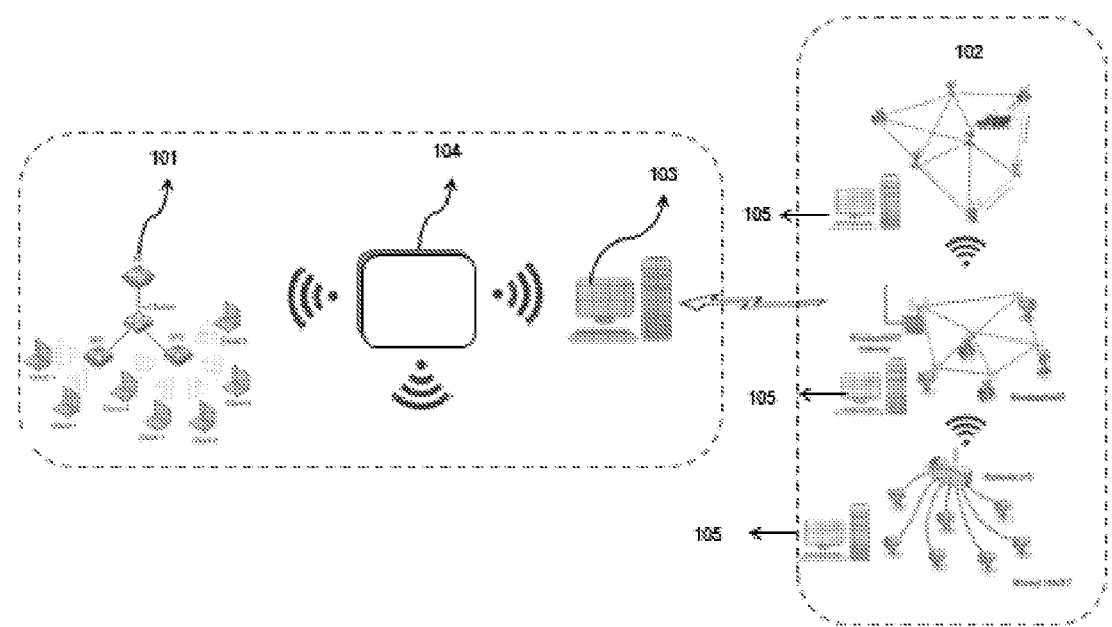
FIG. 1 is exemplary high-level schematic system architecture of the present invention.

As illustrated in FIG. 1, which is an exemplary broad system architecture 100 of the present invention, includes a first network 101, which in the present invention, is advantageously a WLAN network with an arrangement of WLAN network elements such as servers, clients, firewalls, storage networks, routers, switches, network adaptors etc. The exemplary wireless LAN technology (WLAN) that is implemented for the first network 101 of the present invention is of IEEE802.11 standard. FIG. 1 is an example of a first network 101, some of the network elements are shown as client devices (Client 1 . . . N), with corresponding network access points, along with a common multi-network operation advisor 104, as hereinafter described. The client devices can be one or more of tablet personal computers (PCs), personal digital assistants (PDAs), desktop PCs, mobile phones, laptop computers. However, wireless client devices may generally be any client device with a wireless capability. The client devices may also be wired client devices having wireless capabilities. Additionally, implementations for advising wireless computer networks on inter-network interferences may be realized with numerous other general purpose or special purpose devices environments or configurations. Examples of well known devices, systems, environments and configurations that may be suitable for use include multiprocessor systems, microprocessor-based systems, set-top boxes, programmable consumer electronics, videoconferencing equipment, minicomputers and some combination thereof, and so forth.

The first network 101 can be of any network operating in industrial, scientific and medical (ISM) band of frequencies. The first network 101, in this exemplary embodiment is shown as a single unit and it is understood here the first network 101 can also be a group of networks. The first network 101 is also provided with dynamic networking characteristics such as network topologies, physical network structure, capacity or intensity of the network elements and application priorities. The topology of the first network 101 can be one of or a suitable combination of networking topologies such as Point-to-point, Bus, Star, Ring, Mesh, Tree, Hybrid and Daisy chain. The physical structure of the first network includes relative distance between the network elements, where these network elements are disposed to change their relative physical positions inter se during the course of network operations. The capacity or intensity of a network element includes varying signal strength that is experienced by the network element in a given area due to various reasons such as incorporation of physical barriers, shifting of multi-level orientation of network elements etc. resulting in variation of the signal strength, resulting in overlapping of signals from network elements of the network, thereby causing interference. The dynamic networking characteristics include any change in the network topologies, which happen during the runtime of the first network.

The first network 101 is connected to at least a second network or a neighbouring network 102 or a group of networks, which is illustratively shown as a network or group of networks, which interfere with the first network 101. The second network 102 as exemplarily implemented in the present invention is a Highway Addressable Remote Transducer Protocol (WirelessHART), complying with IEEE 802.15.4. The exemplary communication protocols that can be suitably adapted for the second network 102 include WLAN, wirelessHART, Zigbee, Bluetooth device networks, Near Field Communication (NFC) and other similar networks. Therefore, in a multiple network environment as shown in FIG. 1, which is deployed in a large field, there is a need to manage the interference during the lifetime of the networks. This is because the aforementioned communication protocols such as WirelessHART and WLAN, work on the same ISM frequency band, and sometimes in close vicinity, causing interference to each other.

The first network 101 is provided with a network manager 103. The network manager 103 is equipped to control and manage the network elements of the first network 101. The network manager 103 is a computing device configured to perform functions or network actions such as enabling and/or disabling of respective functions of the network elements, configuration of parameters such as transmitting power, operating channel and frequency of the network elements, detection of network conflicts etc., In the present invention, the network manager 103 is also configured to receive network advices from a common network interference advisor 104 and to implement the advices, in the form of network actions. The network manager 103 can also be implemented as an executable device arranged at access points of the network and in routers.

The number and functional aspects of the network manager 103, can be suitably adapted considering the factors such as the heterogeneity of the network elements, topology etc. In other words, it is also within the purview of the invention to envisage more than one network manager Similarly, the second network 102 or the group of networks is also provided with network manager(s) 105. In the present invention, the network manager 105 is also configured to receive network advices from a common network interference advisor 104 and to implement the advices, in the form of network actions.

Figure 2:
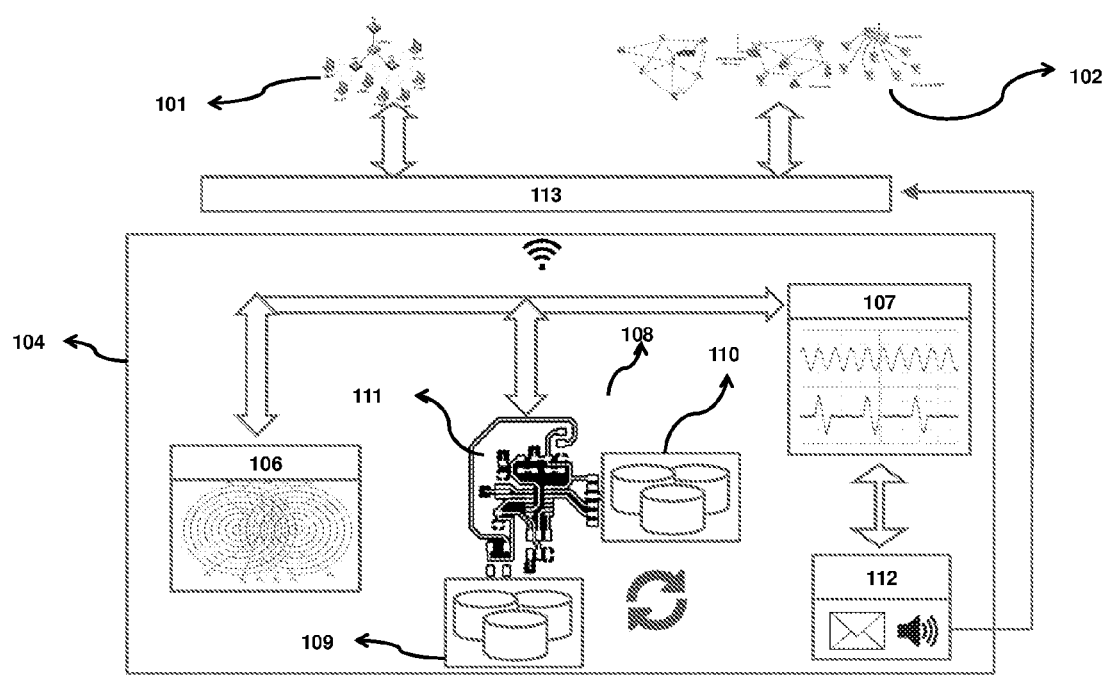
FIG. 2 is a schematic representation of the common multi-network interference advisor of the system of the present invention.

In an aspect of the present invention, as shown in FIG. 2, a common multi-network interference advisor (CMIA) 104 is connected to the first network 101. The common multi-network interference advisor 104 is arranged to collect run-time and historical activity information of the network elements of the first network 101 and provides only the relevant activity information for the interference prone zones in the second network 102 that has to be advised.

CMIA is a processor comprising integrated circuits (ICs) with processor-executable instructions. Alternately, the executables of the processor can also be implemented by quantum computing, optical computing and the like.

The CMIA includes an observer 106, a digital computing device with a processor, which is configured to observe, in runtime, channel utilization of network events of the first network 101 and network interferences from the second network 102. The observer 106 is arranged to observe, dynamically, the occurrence of network events, such as channel utilization of the network elements of the first network 101, which occur in real time and in periodic and aperiodic phases. In other words, the observer 106 monitors the network throughput of the first network 101, which is the rate of successful network data delivery of the first network 101, in each of the available channels, sequentially, in order to observe the extent of utilization of each of the available channels. The observation of the channel utilization, paves the way for further configuration of the operations of the channels, such as allocation or reallocation of a particular channel, black listing one or more channels and temporary suspension of one or more channels.

The observer 106 is also configured to sense inter-network interferences from the second network 102 by preferably measuring packet data loss in different channels of the first network 101 and by measuring effective bandwidth drop in the first network 101.

The observer 106 is also a listening block, which continuously listens to node activity and any interference related information from the gateway/access point of the first network 101. The observer 106 receives updates from the network managers of the individual networks (first network) about the run time activity of the nodes in the respective network, as well as the interference information (spectrum utilisation), which might be observed by the nodes (in the first network) in the network. This information is processed and the communication patterns will be stored in the historical database. This information is also passed on to the advising component.

In yet another aspect of the present invention an aggregator 107, which is a digital computing device with a processor, is connected to the observer 106 and is configured to determine, in runtime, threshold network interferences, from the observed network interferences, from the neighbouring network 102. The aggregator 107 is connected to the observer 106 through network nodes or interfaces.

The aggregator 107 is further configured to identify interference-prone zones of the first network 101 due to presence of neighbouring network(s) 102 and to store the corresponding threshold network interferences.

The aggregator 107 is also configured to aggregate the inputs by normalizing the values to determine network interference patterns of the threshold network interferences, in runtime and advising network actions to the network interference prone zones through the network managers 103 and 105 and storing the network interference patterns in the dynamic database clusters as herein after described.

Dynamic database cluster 108 is connected to the first network 101 and configured to store information on channel utilization and threshold transmission profiles of interfering second network. The dynamic database cluster 108 is advantageously in the form of a multi-tier structured member having a high-speed big data member 109 and a persistent data member 110. A hybrid database connector 111 is arranged to connect the high-speed big data member 109 and the persistent data member 110. The high-speed big data member 109 is advantageously storage medium to process high-speed and high-volume data. This medium uses a distributed computing and parallel data processing. The high-speed big data member 109 stores details of network elements of the first network 101 such as service set identifier (SSID), IP address, bandwidth, channel, network topology information, network activities, interferences, physical structure and the like. In addition, patterns of network activities such as periodic activities that occur in the first network and interferences (transmission profiles), particularly originating from the second network 102 are also stored in the high-speed big data member 109. These patterns include runtime and historical patterns. In this invention, data cluster is preferred to assist in effectively managing data redundancy, load balancing and scalability of the elements of the networks. The high-speed big data member 109 employs wide-column store-based data structures. For instance, databases such as Apache™Hadoop® and Big Table. The persistent data member is incorporated to store validated activity and interference patterns. The persistent data member 107 is adopted to preserve previous versions of the activity and interference patterns, particularly when the elemental changes are effected in the network architecture of the network 101, having an impact on the behaviour or functions of the network entities. For instance, in case the number and configuration of a transceiver that is deployed during the planning stage of the network is changed, the persistent data member of the present invention not only dynamically adapts to these changes but also retains both the versions of the transceiver. The persistent data member 107 is preferably an RDBMS. Alternately, parallel databases can also be used in the system of the present invention.

In order to communicate between two clusters of different type and configuration, the hybrid database connector 111, which is a digital processor, connecting both high-speed big data member 109 and the persistent data member 110 and with other elements of the network. The hybrid database connector 111 is arranged to handle both structured and unstructured data of data members 109 and 110.

A network action communicator 112 is connected to the aggregator 107 and configured to communicate the network advices to the network managers 103 and 105. The network action communicator 112 is a digital processor that is connected to the aggregator to receive network actions and transmit the same to a network manager, in the form of network messages or in case the system is manually operated, the aural messages are transmitted.

A transceiver 113 is connected to the network action communicator 112 to receive and pass the advice to the designated network resource of the first network 101 and also to the second network 102. The transceiver 113 is a router, switch or an adaptor.

The present invention also provides a method for advising wireless computer networks on inter-network interferences, during the lifetime of the networks. The method for advising wireless computer networks on inter-network interferences is implemented in the form of processor-executable instructions. Generally, processor-executable instructions include routines, programs, protocols, objects, functions, interfaces, components, data structures, etc. that perform particular tasks. The method of the present invention may also be implemented in distributed processing environments where tasks are performed by remotely-linked processing devices that are connected through a communications link or a network. The processor-executable instructions may be located in separate storage media, executed by different processors and propagated over transmission media.

In an environment where neighbouring networks are within the vicinity of one another and are likely seek and/or share network resources and data of the networks, a selected network (first network) or networks, at the outset, is initialized to determine and store, in runtime, channel utilization by dynamic network elements of the first network, for performing network events. The CMIA of the first network observes, collects and stores this information, as a historical information in a database and advises appropriate network actions to the first and second network (neighbouring network), which is reckoned as an interfering network, through respective network managers.

The channel utilization is performed in periodic and aperiodic phases, by determining, dynamic characteristics of network topologies, physical network structure, capacity of the network elements and application priorities.

The historical information, on the channel utilization is retrieved by CMIA and the corresponding network action is advised, in advance, to the network managers, particularly of the interfering second networks, whenever such similar network events take place, in a recurring manner, in the first network.

The network events are periodic and aperiodic. The periodic network events include scheduled network events such as the commencement of the activity of the first network, which occurs regularly at a given point of time, resulting in peak consumption of the network bandwidth. Whereas, aperiodic events are those which occur sporadically, such as an additional demand for the channels of WLAN (first network), by an increased number of network elements.

Therefore, the occurrence of these network events, impacts the functioning of the resources of the first network, by causing undesirable network activities such as drop in bandwidth, network packet data loss, network IP address conflicts.

The CMIA in addition to monitoring the network events of the first network also determines, in runtime, threshold transmission profiles, by observing the network interferences from the second network or neighbouring networks in the vicinity. In the process, CMIA determines interference-prone zones of the first network and stores the threshold transmission profiles in the database.

CMIA continuously monitors the spectrum utilization of the WLAN network (first network), and then feeds this information to the network manager of the WirelessHART (second network), which is typically located at the gateway in the WirelessHART topology. Thus apart from the on-the-fly spectrum utilization information, the CMIA also provides the historical spectrum utilization information of WLAN network to the WirelessHART network manager. The on-the-fly information can warn the WirelessHART network manager regarding the intensive usage of certain channels during the past certain minutes/hours of the day, whereas the historical information can warn about the intensive usage of channels frequently used during particular time of the day. For example, the WLAN network may be active only during the office working hours of the plant, and thus affect only those WirelessHART field devices that are in close vicinity to WLAN clients during these working hours.

The transmission profiles (inter-network interferences) of the second network (WirelessHart) can also be periodic and aperiodic. The periodic network interference includes interference where a neighbouring network seeks the resources of the first network regularly, which overlaps with the event and channel synchronization of the network elements of the first network. A periodic interference occurs for instance when a dump vehicle approaching the vicinity of the first network and trying to seek and access the resources or the bandwidth of the first network. Therefore, the occurrence of these network interferences, impacts the functioning of the resources of the first network, by causing undesirable network activities such as drop in bandwidth, network packet data loss, network IP address conflicts.

The determination of network interferences by CMIA is performed by one or many steps of monitoring of throughput data, determining packet data conflict, measuring the magnitude and type of network interference, in runtime.

The network interferences are static and mobile. In other words, the method of the present invention can be implemented where the network elements of the neighbouring networks are static or mobile.

The CMIA is configured to determine network interference patterns of the network threshold network interferences, in runtime, by comparing the current network interferences with the previous or historical interferences and advising corresponding network actions to the network managers of first and second networks.

The interference patterns are determined by CMIA from network elements, network events, network interferences and network advices. These include dynamic network topology events, historical events, real-time interferences, network advisory messages, prioritized network elements, network applications and network activity logs.

The advising of network actions to the network managers, by CMIA, includes avoiding time-slot and frequency synchronization of the network events, reducing the bandwidth usage package of the second network, routing data packets of the second network from the interference prone zones, blacklisting of channels under use by the network elements of the first network, lowering update rate of the network elements, managing the network events through lower throughput; and reconfiguring of network elements of said first network by making unavailable the channels under use, for the threshold network interferences.

The network actions as advised by the CMIA, are preventive, real-time and proximity-based.

Figure 3:
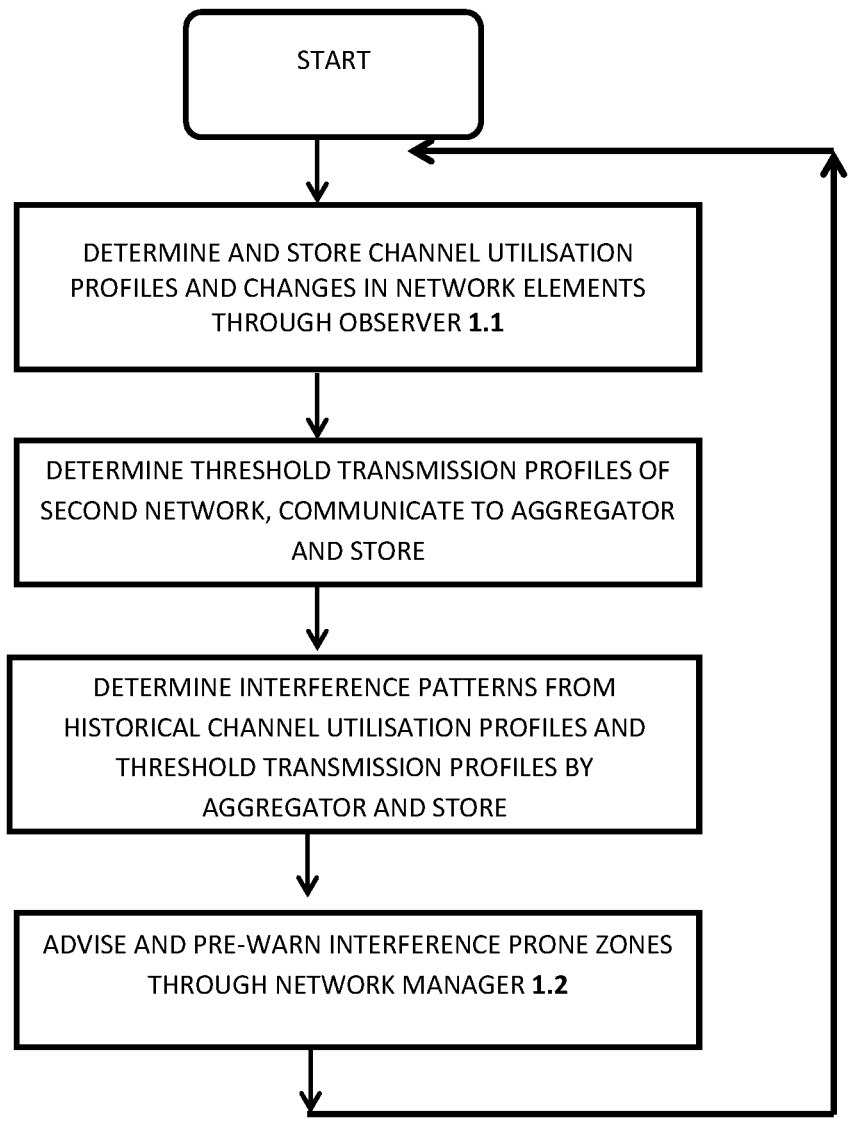
FIG. 3 is a flow drawing that illustrates an example of method of advising wireless network on inter-network interferences.
Figure 4:
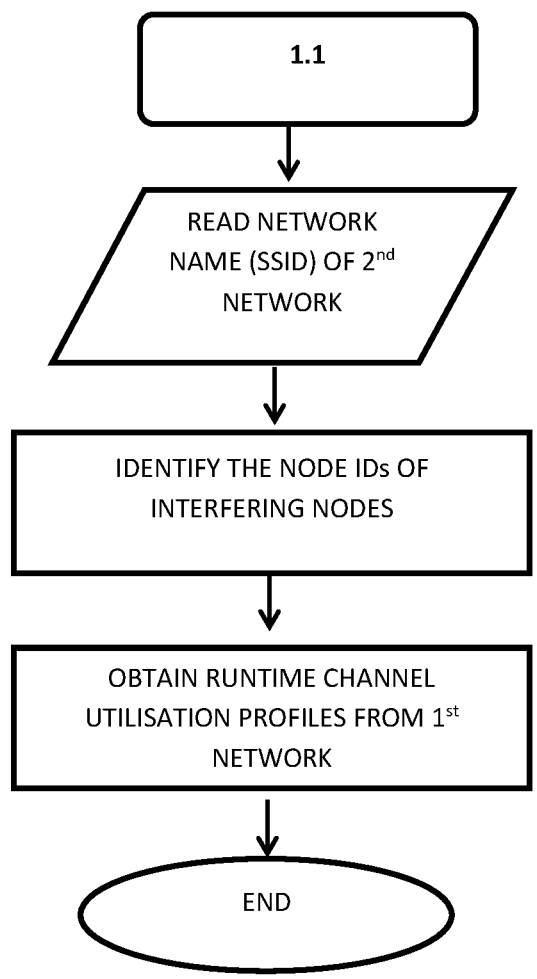
FIG. 4 is a flow drawing that illustrates an example of method of determining, channel utilization profiles and network characteristics of a network.
Figure 5:
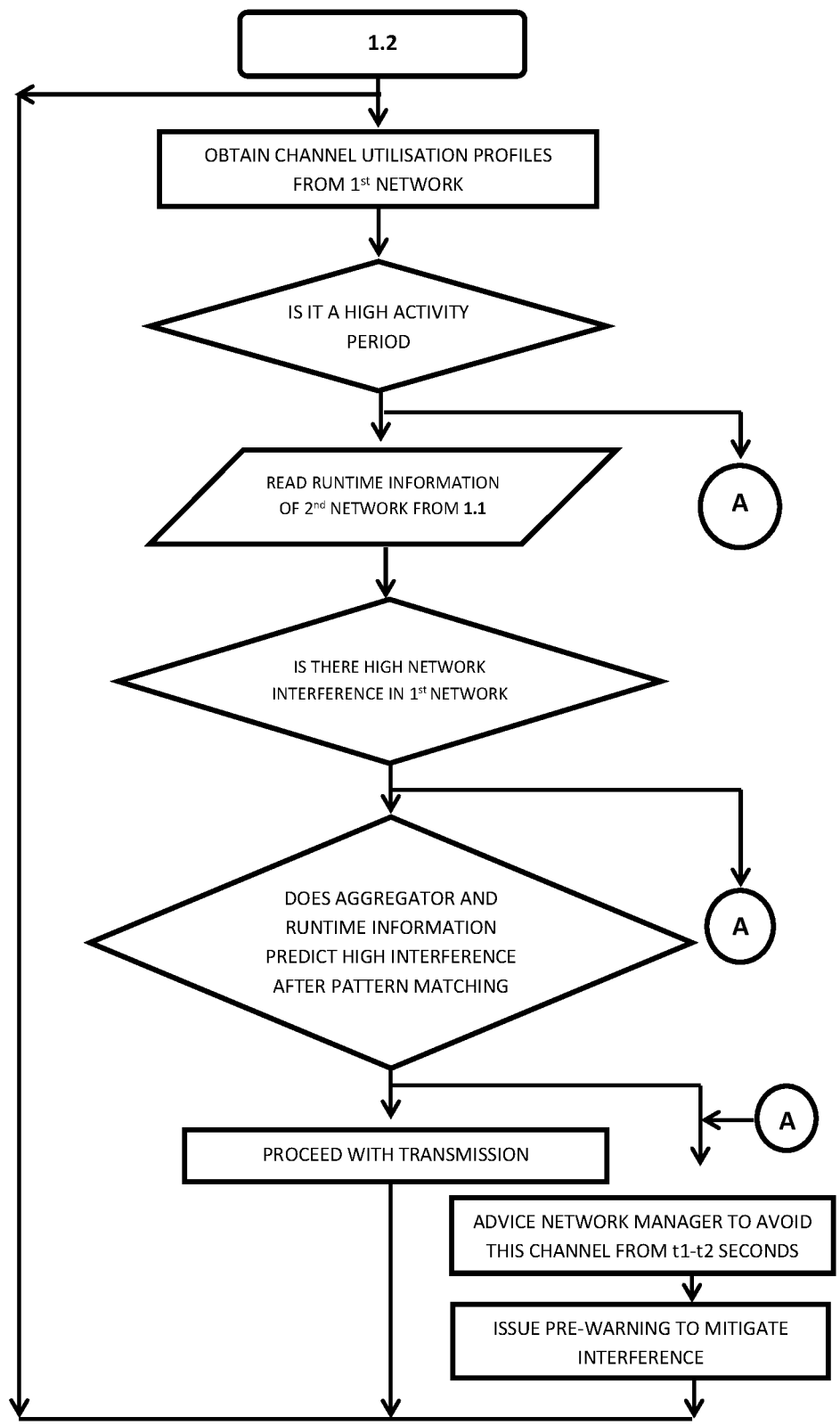
FIG. 5 is a flow drawing that illustrates an example of method of advising and pre-warning of networks on inter-network interferences.

The method for advising wireless computer networks on inter-network interferences during their lifetime is now described further by specifically referring to FIGS. 3-5. In this method, once a network (first network), which is required to be monitored for network interferences, is actuated, in addition to the execution of boot process routines, recording of channel utilization profiles of the dynamic network elements is performed, advantageously, by the network manager of the first network. The channel utilization profiles identify and indicate the details of usage of channels by each of the network elements of the first network, while performing the assigned user tasks. The details of channel utilization profiles include channel number, channel frequency and transmission power or magnitude of transmission. In addition to these details the corresponding time-slots of respective channel utilization profiles of the dynamic network elements. In addition network characteristics of the first network are also captured. The initial channel utilization profiles are stored in a dynamic data cluster of the first network, as historical channel utilization profiles. The capturing of channel utilization profiles is performed periodically, aperiodically, in runtime and during the course of the life span of the network. Any changes in the network characteristics and the net work elements, are also captured, in runtime and the same are stored in the dynamic data cluster. The capturing of channel utilization profiles of the first network provides an insight into the network state and dataflows of each of the network elements of the first network.

Concomitantly, observing or listening of initial transmission profiles of an interfering or a neighbouring second network is performed by the observer, where the initial transmission profiles interfere with the initial channel utilization profiles of the first network. The observed initial transmission profiles are communicated to the aggregator of the first network. The observation of transmission profiles is performed periodically, aperiodically and in runtime. The observer continuously listens to the transmission of profiles of neighbouring networks, which seek or interfere with the channel utilization profiles of the first network. The initial transmission profiles include the details of name of the network, service set identifier (SSIDs), type of network, time, proximity, network strength, intermittent or sustained interference etc., of the interfering second network.

The aggregator analyses the initial transmission profiles and determines threshold transmission profiles, which are likely to interfere with the channel utilization profiles of the first network. In other words, the aggregator ignores those transmission profiles, which are brief and intermittent, which do not really cause interference to the first network.

For instance, in a network having a data rate of 11 mbps, typical peak signal-to-noise ratio (SNR) is 7 db, which is considered as a low-grade interference or a transmission profile. The higher peak SNR can be as high as 24 db, which is considered as high-grade interference or transmission profile. To balance the interference between networks the aggregator maintains SNR>24 db. Therefore, as shown in Table 1, the threshold for lower interference is 7 db and whereas the threshold for higher interference is 24 db.

TABLE 1

| 802.11b data rate (Mbps) | SNR (dB) | 802.11g data rate (Mbps) | SNR (dB) |
| --- | --- | --- | --- |
| 1 | 0 | 6 | 5 |
| 2 | 2 | 9 | 6 |
| 5.5 | 3 | 12 | 8 |
| 11 | 7 | 18 | 10 |
|  |  | 24 | 13 |
|  |  | 36 | 16 |
|  |  | 48 | 21 |
|  |  | 54 | 24 |

Figure 6:
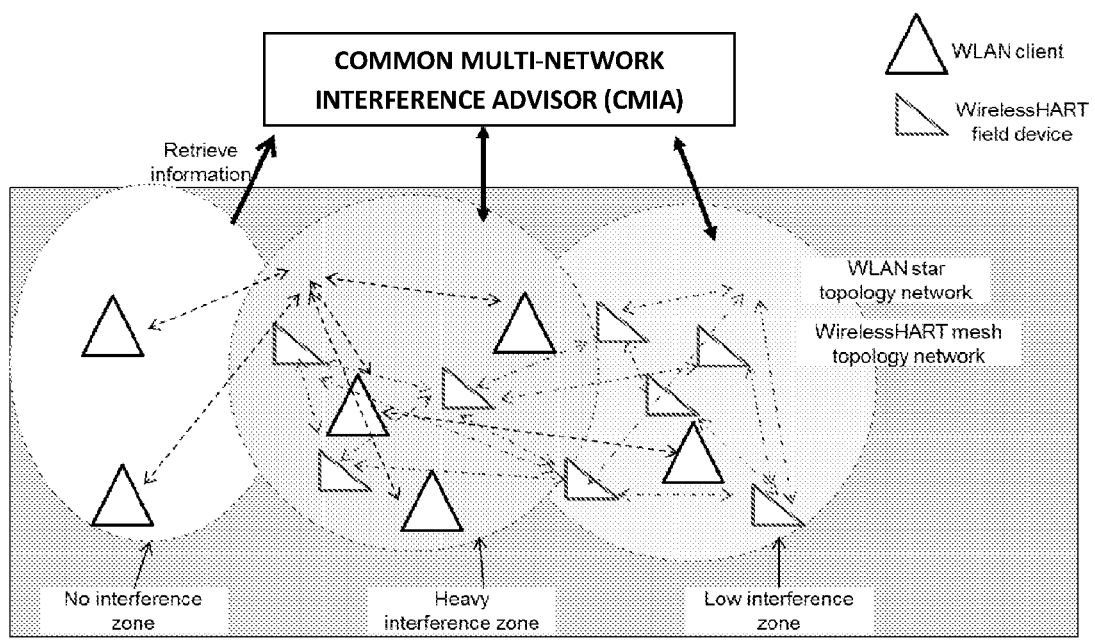
FIG. 6 is a schematic drawing depicting interference prone zones of an interfered network.

While doing so, the aggregator will also identify interference prone zones of the first network, as shown in FIG. 6, so that only those zones of the network that are affected by substantial interferences, by the neighbouring networks (second network) are considered for advice.

Once the threshold transmission profiles are determined the aggregator stores these threshold transmission profiles in the dynamic data cluster, as historical transmission profiles.

Once the threshold transmission profiles are determined, the aggregator gets to the task of comparing the historical channel utilization profiles with runtime threshold transmission profiles, to obtain, in runtime, interference patterns. The interference patterns are stored in the dynamic data cluster. The interference patterns are those matching events, which are determined at various network phases such as periodic, aperiodic and runtime, which are used to initiate pre-emptive actions such as pre-warning a potential interference, to the network manager, prior to the happening of this interference, so that the first network can take appropriate remedial measures, in securing the channel utilization profiles of the first network or re-allocating resources of the first network so as to allow the resources of the first network to the interfering network. The network patterns thus determined are stored in the dynamic data cluster.

Therefore, the aggregator advises the network manager of the first network on the interference prone zones, to initiate appropriate suitable network actions.

The advising of networking actions by the aggregator involves multi-fold actions, where depending on the nature and type of transmission profiles (interferences) the aggregator advises actions, such as reducing the bandwidth allocation to the interfering second network, routing data packets of the second network from the interference prone zones of the first network; blacklisting of channels under use by the network elements of the first network for the second network and managing the network activities of the first network by optimizing throughput of said first network.

Whereas the pre-warning by the aggregator is performed by advising the network manager to avoid time-slot and frequency synchronization of the channel utilization profiles, by the second network.

In the system and method of the present invention the entities that control the WLAN transmissions of the first network based on the transmission profiles of the second network (wirelessHART) are advantageously arranged either at the application layer or at the network layer, depending on the configuration of the WLAN network. For instance the WLAN traffic is preferably coordinated based on the WirelessHART traffic, in any one or more of following steps:—

The first network (WLAN) can be operated according to a time division multiple access (TDMA), where the WLAN transmissions are controlled from the application layer of a Master. The Master can take inputs from a WirelessHART static link table transmission schedule, and avoid transmissions at the channels & time slots when the wirelessHART field devices are active in the high interference zones. In this case, the controls of WLAN transmissions happen at the application layer of the Controller, which implements the TDMA scheme.

The first network of WLAN having an access method such as Point coordination function (PCF), the access point acts as the point coordinator, and coordinates the communication within the WLAN network. The polling coordinator always has priority over the channel. Channel access in PCF mode is centralized and hence the point coordinator sends CF-Poll frame to the PCF capable station to permit it to transmit a frame. Such a WLAN access point acting in PCF mode, as the point coordinator, which is fed with information regarding the WirelessHART link table transmission schedule, can keep the WirelessHART transmission slots free of WLAN traffic, thus reducing the interference.

In a case, where the first network (WLAN) is operated in a hybrid coordination mode (HCF), the coordinator (Access Point) controls the WLAN transmissions during some part of the frame, and a period in this contention free period can be used by the WirelessHART network for transmissions. This requires coordination between the network manager for WirelessHART as well as the WLAN Access point. It is to be understood here that CMIA may require minimal or no changes to the protocol stack of wirelessHART and WLAN system. The additional executables that are required to handle such changes can be suitably incorporated in the application layer, to add this functionality.

The implementation of the method of the present invention is now instantiated with the following illustrative examples.

Example 1

Figure 7:
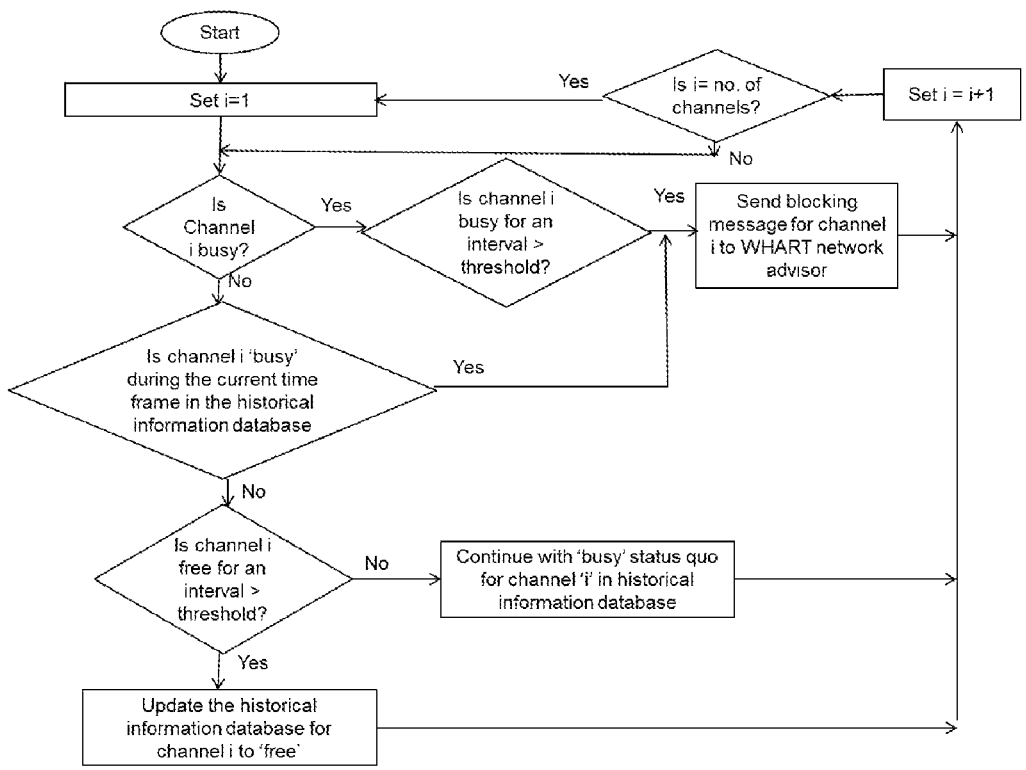
FIG. 7 is an exemplary flow drawing of process flow of CMIA, in addressing wireless HART interferences.

A first network is provided with Error! Reference source not found. LAN and a second network with WirelessHART architectures. Whenever, the WirelessHART falls within the working range of the WLAN network, WirelessHART field devices and WLAN clients, overlapping of channel utilization profiles is observed in certain heavy interference zones. In this instance, the interference from WLAN is significant only in the regions that accessed by the WirelessHART network. The WirelessHART field devices that are significantly away from the WLAN clients induce only medium to low interference. CMIA then advises the network manager of the first network to advise the network manager to perform network re-setting methods such as blacklisting, or re-configuration, in order to work around the interference caused by WirelessHART devices. The CMIA continuously listens to the activity in WLAN network regarding the channel usage profile of the WLAN clients that are situated in the heavy interference zone, and then adequately informs the wirelessHART with both on-the-fly and historical data. Based on this information from the CM IA, the wirelessHART network manager at the scheduled time performs, as shown in FIG. 7, the network reconfigurations such as;
  (i) Re-configuring the network such that the field devices of the WirelessHART, in the heavy interference zones are not allotted any channels that have the potential to be interfered by the WLAN network.
  (ii) Blacklisting of channels, either manually, through an operator or automatically, which are under heavy usage by the WLAN network, by the network manager.
  (iii) Lowering the update rate or activate only certain applications that can be managed with the lower throughput or the delay caused due to the interference. For instance, the application requirement can be changed from control to only logging application for the zones that are particularly prone to interference during the certain hours of the day or when there is sudden heavy utilization by the WLAN network.

Example 2

A first network is provided WLAN and a second network with WirelessHART architectures. The WirelessHART is arranged to fall within the working range of the WLAN network, whereby overlapping of channel utilization profiles of WLAN clients by the WirelessHART field devices, is observed. CMIA provides WLAN network managers with the transmission schedules of WirelessHART devices and the network manager advises WLAN access point to centrally control the transmission of the first network based on the static schedule information available from the wirelessHART network, as shown in FIG. 8. The link table as shown in FIG. 8 having the transmission schedule information of the WirelessHART network is fed into an entity controlling the WLAN transmissions via the CMIA. Typically in a WirelessHART network, the channel and the time slots schedule between the different field devices is already defined by the network manager during the configuration stage. A table like this remains static until the next configuration period. This information is directly fed to WLAN, and based on this information, the WLAN network schedules its transmissions within the high interference zones at the appropriate time and with non-interfering channel. Considering a transmission profile of the WirelessHart seeking the resources of the WLAN, where activity from the WirelessHART causes interference to the select zones, the corresponding channels of WLAN are affected by the interference. For instance, as shown in FIG. 8, the channel No. 7 in the time slot 1 receives instructions from network manager to shift to channel No. 2. Similarly, activity of channel No. 2 is shifted to channel No. 6 of time-slot 29.

Some of the exemplary scenarios of the communication between network managers and the CMIA are as shown in FIG. 9. These exemplary scenarios highlight the determination of threshold interferences (transmission profiles) and the corresponding networking advices and actions, including pre-warnings.

In one scenario, a WirelessHART network manager can inform the CMIO of the transmission schedule for the next interval. The CMIO passes on this information to the other Network managers in the vicinity, and the other network managers take necessary actions to avoid the time-slot & frequency combination to avoid possible interference to itself, and to the WirelessHART network, as shown at S.No. 1 of FIG. 9.

In another exemplary scenario, in an establishment where the enterprise WLAN co-exists with a factory WirelessHART network, the historical database contains patterns related to WLAN network, such as the expected period of time it is active. The CMOA advices the factory WirelessHART to reduce bandwidth usage during this busy period, or to route the packets in a mesh path that is away from the office space, as shown at S. No. 2 and 3 of FIG. 9.

In yet another exemplary scenario, the network manager of one network can intimate the CMIA that a given channel would be active for a given period of time. The CMIA advices other network managers in the vicinity, so that they can avoid the given channel, as shown at S.No. 4 and 5 of FIG. 9.

In yet another scenario where wireless applications are used in heavy engineering enterprises such as Mining, Oil and Gas, where an interfering network event is followed by a flurry of network activity. For instance, an approaching container or a dump vehicle, which is followed by a lot of communication over the communication network, to coordinate the actions of different nodes in the vicinity. The CMIA detects such communication patterns corresponding to an event, and predicts the network activity based on such events. It advises the networks in the vicinity, about the upcoming busy period for the network, based on the events it detected, so that the nearby network managers can take steps to manage interfering traffic, shown at S.No. 7 of FIG. 9.

ADVANTAGES OF THE PRESENT INVENTION

The system and method of the present invention can be implemented with minimal or no changes to the protocol stack of the networks such as WirelessHART and WLAN.

The system and method of the present invention enable an efficient deployment of ISM-based networks considering one network is already in place or vice-versa.

The system and the method of the present invention can be implemented at the application layer of the networks.

We claim:

1. A method for advising wireless computer networks on inter-network interferences during their life time, said method comprising:
   (i) determining, by an observer, initial channel utilization profiles along with corresponding time-slots of dynamic network elements and network characteristics of at least a first network and storing, by an aggregator, said initial channel utilization profiles in a dynamic data cluster of said at least first network, as historical channel utilization profiles;
   (ii) observing, by said observer, initial transmission profiles of at least an interfering second network, where said initial transmission profiles interfere with said initial channel utilization profiles of said at least first network and communicating said initial runtime transmission profiles to said aggregator;
   (iii) determining threshold transmission profiles and identifying interference prone zones, and storing said threshold transmission profiles in said dynamic data cluster, by said aggregator, as historical transmission profiles;
   (iv) determining, by said aggregator, in runtime, interference patterns, by comparing historical channel utilization profiles with runtime threshold transmission profiles and storing the said interference patterns in said dynamic data cluster;
   (v) advising network actions, by said aggregator, to a network manager of said at least first network on said interference prone zones; and
   (vi) issuing, by said aggregator, a pre-warning and an alert to said network manager on said channel utilization profiles based on said interference patterns.

2. The method as claimed in claim 1, wherein said initial and runtime channel utilization profiles and said runtime transmission profiles are periodic and aperiodic.

3. The method as claimed in claim 1, wherein said observation of initial and threshold runtime transmission profiles is performed by:
   a. identifying the name of said interfering second network;
   b. detecting node IDs of said first network that are to be interfered by said interfering second network; and
   c. obtaining runtime channel utilization profiles from said first network.

4. The method as claimed in claim 1, wherein said advising of networking actions, comprises one or more steps of:
   a. reducing bandwidth allocation to said interfering second network;
   b. routing data packets of said second network from said interference prone zones of said first network;
   c. blacklisting of channels under use by said network elements of said first network for said second network; and
   d. managing said network activities of said first network by optimizing throughput of said first network.

5. The method as claimed in claim 1, wherein said pre-warning is performed by advising said network manager to avoid time-slot and frequency synchronization of said channel utilization profiles, by said second network.

6. A system for advising wireless computer networks on inter-network interferences, comprising:
   (i) at least a first network with dynamic network elements and at least an interfering second network with a network manager;
   (ii) a common multi-network interference observer, including
      at least an observer configured to observe, in runtime, channel utilization profiles of dynamic network elements of said first network and threshold transmission profiles of said interfering second network;
      an aggregator operably connected to said observer, said aggregator configured to determine, in runtime, threshold network interferences, from said observed network interferences;
      dynamic data cluster, operably connected to said first network and configured to store information on channel utilization and threshold transmission profiles; said aggregator further configured to identify interference-prone zones of said first network and to store said threshold transmission profiles, and to determine network interference patterns of said threshold transmission profiles, in runtime and advising network actions to said network interference prone zones through said network manager and storing said network interference patterns in said dynamic data cluster; and
      a network action communicator operably connected to said aggregator and configured to communicate said network advices to said network manager.

7. The system as claimed in claim 6, wherein said dynamic network elements include network topologies, physical network structure, client devices and application priorities.

8. The system as claimed in claim 6, wherein said first network is a wireless local area network (WLAN) and said second network is a highway wireless addressable remote transducer (WirelessHART) protocol or networks operating in industrial, scientific and medical (ISM) band of frequencies.

9. The system as claimed in claim 6, wherein a transceiver disposed to connect said first and second networks, said transceiver is a router, switch or an adaptor.

10. The system as claimed in claim 6, wherein said dynamic data cluster comprises:
    (a) at least a high-speed big data member;
    (b) at least a persistent data member; and
    (c) a hybrid database connector operably connecting said high-speed big data member and said persistent data member.

11. A network interference system for advising wireless computer networks on interferences, comprising:
    (i) at least a first network having dynamic network elements and at least an interfering second network having a network manager;
    (ii) a multi-network interference observer, including
       an observer configured to observe, in runtime, channel utilization profiles of the dynamic network elements of said first network and threshold transmission profiles of said interfering second network;

an aggregator operably connected to said observer and configured to determine, in runtime, threshold network interferences, from observed network interferences;

dynamic data cluster, operably connected to said first network and configured to store information on channel utilization and threshold transmission profiles; said aggregator further configured to identify interference prone zones of said first network and to store said threshold transmission profiles, and to determine network interference patterns of said threshold transmission profiles, in runtime, to advise network actions to said network interference prone zones through said network manager, and to store said network interference patterns in said dynamic data cluster; and a network action communicator operably connected to said aggregator and configured to communicate said network advices to said network manager.

12. The system as claimed in claim 11, wherein said dynamic network elements include network topologies, physical network structure, client devices and application priorities.

13. The system as claimed in claim 11, wherein said first network is a wireless local area network (WLAN) and said second network include one or more of a highway wireless addressable remote transducer (WirelessHART) protocol and at least one network operating in industrial, scientific and medical (ISM) band of frequencies.

14. The system as claimed in claim 11, wherein a transceiver disposed to connect said first and second networks, said transceiver is a router, switch or an adaptor.

15. The system as claimed in claim 11, wherein said dynamic data cluster comprises:
(a) at least a high-speed big data member;
(b) at least a persistent data member; and
(c) a hybrid database connector operably connecting said high-speed big data member and said persistent data member.

* * * * *